(12) United States Patent
Schulz et al.

(10) Patent No.: US 10,655,681 B2
(45) Date of Patent: May 19, 2020

(54) BEARING ASSEMBLY

(71) Applicant: Aktiebolaget SKF, Gothenburg (SE)

(72) Inventors: Ingo Schulz, Gerolzhofen (DE);
Tilmann Haar, Hassfurt (DE); Daniel Reck, Würzburg (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/196,484

(22) Filed: Nov. 20, 2018

(65) Prior Publication Data
US 2019/0203823 A1      Jul. 4, 2019

(30) Foreign Application Priority Data
Jan. 3, 2018   (DE) .......................... 10 2018 200 055

(51) Int. Cl.
*F16C 35/06* (2006.01)
*F16H 57/02* (2012.01)
*F16H 57/023* (2012.01)

(52) U.S. Cl.
CPC ............ *F16C 35/06* (2013.01); *F16H 57/023* (2013.01); *F16C 2226/60* (2013.01); *F16C 2361/65* (2013.01)

(58) Field of Classification Search
CPC ...... F16H 1/28; F16H 57/023; F16H 57/0469; F16H 57/08; F16H 2057/00043; F16H 2057/02039; F16H 2057/085; F16H 2057/0043; F16C 35/00; F16C 35/02; F16C 35/04; F16C 35/06; F16C 35/061; F16C 35/062; F16C 2226/60; F16C 2226/62; F16C 2322/59; F16C 2361/65; B25J 17/00; F16B 27/00; F16B 35/00
(Continued)

(56) References Cited

U.S. PATENT DOCUMENTS

| 4,733,458 A | * | 3/1988 | Benfer | ..................... B21B 31/07 29/724 |
| 5,590,967 A | * | 1/1997 | Kapaan | .................. F16O 19/166 384/448 |

(Continued)

FOREIGN PATENT DOCUMENTS

| CN | 203542509 U | 4/2014 |
| EP | 0233596 A2 | 8/1987 |
| JP | 2013166518 A | 8/2013 |

*Primary Examiner* — Adam D Rogers
(74) *Attorney, Agent, or Firm* — J-Tek Law PLLC; Scott T. Wakeman; Mark A. Ussai

(57) ABSTRACT

A bearing assembly for rotatably supporting a first carrier element on a second carrier element includes first and second parts, each having a through-bore, configured to rotate about a common axis, and a first fastener for attaching the first part to the first carrier element and a second fastener for attaching the second part to the second carrier element. The first and the second through-bores are aligned with each other, and the second fastener is configured to pass entirely through the first through-bore into the second through-bore and engage an interior of the second through-bore to fasten the second part to the second carrier element. The first fastener is too large to pass entirely through the first through-bore and is configured to engage an interior of the first through-bore to fasten the first part to the first carrier element.

15 Claims, 1 Drawing Sheet

(58) Field of Classification Search
USPC .......................................................... 411/383
See application file for complete search history.

(56) References Cited

U.S. PATENT DOCUMENTS

| | | | |
|---|---|---|---|
| 6,059,374 A | 5/2000 | Goddard | |
| 10,072,703 B2 * | 9/2018 | Frank | ...................... F16O 35/04 |
| 2019/0242435 A1 * | 8/2019 | Baumann | ............ F16O 33/7823 |

* cited by examiner

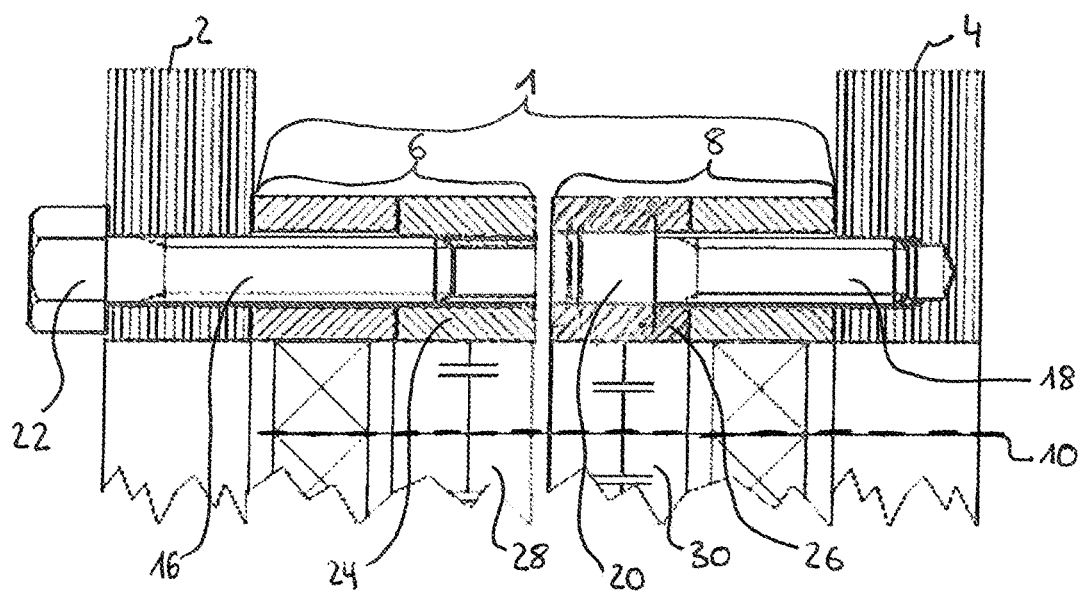

BEARING ASSEMBLY

CROSS-REFERENCE

This application claims priority to German patent application no. DE 2018200055.7 filed on Jan. 3, 2018, the contents of which are fully incorporated herein by reference.

TECHNOLOGICAL FIELD

The present disclosure relates to a bearing assembly for rotatably supporting a first carrier element on a second carrier element and to a method for assembling same.

BACKGROUND

In order to connect two carrier elements, for example, an arm of a robot to a base part, so that the one carrier element can be pivoted or rotated with respect to the other carrier element, bearing elements can be used. These bearing elements can be simple bearings, but also more complex structures such as, for example, planetary transmissions.

These bearing elements can be disposed between the carrier elements that are to be rotatably supported with respect to each other. Here the bearing elements are rotatable about a common axis of rotation and can be disposed on a common shaft. In order to attach the individual elements, i.e. the two carrier elements, and the bearing elements, to one another, in known systems all elements are arranged and then the first part, i.e. the first bearing element, is attached to the first carrier element, for example, the arm, wherein an attaching bolt or an attaching screw is introduced into the first part through the first carrier element from the outside of the first carrier element. Subsequently the second carrier element, for example, a base part, is attached to the second part, i.e. the second bearing, wherein an attaching bolt or an attaching screw is introduced into the second part through the second carrier element from the outside of the second carrier element. It is disadvantageous here that there are two different attaching directions (one from the outside of the first carrier element and one from the outside of the second carrier element), whereby a completely automated attaching process is difficult to realize.

Alternatively, after arranging the individual elements, both attaching bolts or screws can be introduced from the same side, for example, from the side of the first carrier element, by the two bearing elements, i.e. the first part and the second part, having different diameters. In this way the openings for receiving the bolts in the assembled state can be reached from one side on both parts. However, this leads either to the smaller part having a lower load capacity, i.e. due to its smaller size can only support smaller loads, and/or the larger part having a higher weight, and is therefore more expensive or leads to an uneven load distribution on the shaft.

SUMMARY

It is therefore an aspect of the present disclosure to provide a bearing assembly wherein a first and a second carrier element can be rotatably supported in a simple manner by the bearing assembly, and wherein an automated attaching process of the bearing assembly to the first and the second carrier element is possible.

Here the bearing assembly serves for the rotatable supporting of a first carrier element on a second carrier element and includes a first part and a second part that are rotatable about a common axis of rotation. The first part is attachable to the first carrier element using at least one first attaching means, and the second part is attachable to the second carrier element using at least one second attaching means.

In order to simplify the attaching and to permit an automated attaching, the first part includes at least one first through-bore and the second part includes at least one second through-bore. The first and second through-bores are arranged in succession such that the first and the second through-bore are aligned with each other. The second attaching means can then be pushed through the first through-bore into the second through-bore in order to attach the second part to the second carrier element. The first attaching means can then be pushed into the first through-bore in order to attach the first part to the first carrier element.

The first carrier element can be a pivotable arm, for example, of a robot. The second carrier element can be, for example, the body of the robot. The second carrier element can be referred to as a base element, which represents a relative reference system with respect to the first carrier element.

The first and second parts together can constitute a gearing mechanism. For example, the first and the second parts can constitute parts of a planetary gearing mechanism, wherein the two parts can be ring gears. In this case the common axis of rotation can be a central shaft on which the two parts are supported in an overhung manner. Alternatively the two parts can also be two bearings that are connected to each other via a central shaft.

Due to the passing of the second attaching means through the first through-bore into the second through-bore the attaching can be effected from one side, i.e. from the side of the first carrier element. An attaching from the other side, i.e. from the side of the second carrier element, is therefore not required. The attaching process can thus proceed in a fully automated manner since the access occurs in a simple manner from only one side. Furthermore, different diameters of the two parts are not required.

The first through-bore and the second through-bore can extend coaxially or radially with respect to the common axis of rotation.

This depends on the design of the bearings. If they are radial bearings, the through-bores extend radially with respect to the common axis of rotation. If the two parts are axial bearings, the through-bores extend coaxially with respect to the common axis of rotation.

According to one embodiment the second attaching means has an inner profile for receiving a tool for attaching the second attaching means to the second carrier element.

Here the inner profile can be, for example, a hexagonal inner profile. Since the second attaching means has an inner profile in order to receive a tool, the through-bore can be dimensioned such that only the attaching means can be introduced. Additional space for the tool must not be present since it engages into the attaching means from the inside.

The first attaching means can have an outer profile for receiving a tool for attaching the first attaching means to the first part.

Here the outer profile can also be a hexagonal profile. Here the first attaching means can protrude from the first carrier element after the attaching. Alternatively the first carrier element can have a recess that corresponds to the depth of the outer profile so that it the outer profile can be sunk into the recess. The diameter of the recess should be sufficiently large to permit the outer profile to be surrounded by the tool. It is also possible that the first attaching means has an inner profile instead of an outer profile. The inner profile can also be, for example, a slot for receiving a screwdriver.

In order to connect the first carrier element to the first part, the first through-bore can have a thread and the first carrier element can have a supporting section.

The first attaching means then engages into the thread of the first through-bore and is supported on the supporting section of the first carrier element. In this way the first carrier element can be connected to the first part by tensile force. Here the supporting section can either directly be a part of the first carrier element or be formed by a washer or the like.

The second carrier element can include a thread, and the second part can include a supporting section. Here the second attaching means is configured to engage into the thread of the second carrier element and to support it on the supporting section of the second part.

Here the supporting section of the second part is integrated into the second part so that the second attaching means can be supported on the second part. Here the attaching means completely disappears in the second part.

At least one third part can be respectively disposed between the first part and the first carrier element and/or the second part and the second carrier element. Here the third part includes at least one recess that is alignable with the first and the second through-bore.

The third part can be used, for example, to provide a spacing between the first part and the first carrier element and/or a spacing between the second part and the second carrier element. The third part can be configured, for example, as a disc having holes that represent the recess, or can be configured as a disc corrugated in the radial direction. Here the valleys of the corrugated disc represent the recesses.

The bearing assembly can be, for example, a planetary transmission that is disposed in a transmission housing. In this case the first part and the second part can represent two parts of the planetary transmission. Here the second part, which is connected to the second carrier element, for example, to the base element, controls the first carrier element, which is connected to the first part. The first part and the second part can form a translation step so that a different rotational speed is possible between the first carrier element and the second carrier element.

The first part and the second part can both be configured as radial bearings or both as axial bearings. Depending on this, the through-bores can be disposed coaxially or radially with respect to the axis of rotation, as explained above.

The bearing assembly can be used, for example, in a robot. This includes a first carrier element and a second carrier element, which are rotatably or pivotably supported with respect to each other by the bearing assembly. The first carrier element can be parts of the robot that are to be disposed rotatably or pivotably with respect to the second carrier element. Here the second carrier element represents a fixed reference system for the first carrier element and can itself be rotatably supported with respect to a further carrier element. The first carrier element is, for example, an arm or a part of an arm of a robot, wherein in the first case the second carrier element can be a robot body and in the second case a further part of a robot arm. The bearing assembly can function as a joint between the first carrier element and the second carrier element.

According to a further aspect, a method is proposed for the rotatable supporting of a first carrier element on a second carrier element. Here in a first step the first carrier element and the second carrier element are arranged, and a bearing assembly is disposed between these two carrier elements. The bearing assembly includes a first part and a second part that are rotatable about a common axis of rotation, wherein the first part is attachable to the first carrier element using at least one first attaching means, and wherein the second part is attachable to the second carrier element using at least one second attaching means.

The first part includes at least one first through-bore, and the second part includes at least one second through-bore. In a second step the first and the second through-bores are arranged in succession such that the first and the second through-bores are aligned with each other and the second attaching means is slidable into the second through-bore through the first through-bore. If the second attaching means has been correspondingly pushed-through in a third step, it attaches the second part to the second carrier element.

In a fourth step the first attaching means is pushed into the first through-bore and attaches the first part to the first carrier element.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail on the basis of the exemplary embodiments depicted in the drawings. Here the exemplary embodiments and the combinations shown in the exemplary embodiments are purely exemplary and are not intended to define the scope of the invention. This scope is defined solely by the pending claims.

BRIEF DESCRIPTION OF THE DRAWING

FIG. 1 shows a sectional view of a bearing assembly for the rotatable supporting of a first and of a second carrier element.

DETAILED DESCRIPTION

In the following, identical or functionally equivalent elements are designated by the same reference numbers.

FIG. 1 shows a bearing assembly 1 that is configured to rotatably support two carrier elements 2, 4, for example, an arm 2 of a robot on a base part 4. The bearing assembly 1 is comprised of a first part 6 and a second part 8 that are rotatable about a common axis of rotation 10 (only indicated schematically). The first part 6 and the second part 8 can be simple bearings, but also more complex structures such as, for example, parts of a planetary transmission. In the case of a planetary transmission, the bearing assembly 1 can be a planetary transmission that is disposed in a transmission housing. The first part 6 and the second part 8 are then disposed on a common shaft. As indicated in FIG. 1, the first part 6 and the second part 8 can include gears 28, 30 that are part of a planetary transmission. Furthermore, ring gears 24, 26 can be elements of the first and second part 6, 8.

In order to attach the individual elements 2, 4, 6, 8 to one another, all elements are first arranged. In order to make possible a simple, automated attaching, the bearing assembly 1 shown in FIG. 1 provides for an attaching from one side.

In the following, this attaching is described with reference to FIG. 1.

The first part 6 includes at least one first through-bore, and the second part 8 includes at least one second through-bore.

The first and the second through-bore are arranged in succession with respect to each other such that they are aligned with each other. Each part 6, 8 can also include more than one through-bore.

First a second attaching means 18, for example, an attaching bolt or an attaching screw, is pushed through the first through-bore into the second through-bore in order to attach the second part 8 to the second carrier element 4. In order to fasten the second part 8 and the second carrier element 4, the second attaching means 18 includes a thread that engages into a counter-thread in the second carrier element 4. On the opposite side of the second attaching means 18 an inner profile 20 is provided, into which a tool can engage in order to rotate the second attaching means 18. Furthermore, a supporting section is provided in the second part 8, on which supporting section the end of the second attaching means 18, which end is opposite the thread, can be supported.

Subsequently a first attaching means 16, for example, an attaching bolt or an attaching screw, can be pushed into the first through-bore in order to attach the first part 6 to the first carrier element 2. In order to fasten the first part 6 and the first carrier element 2, the first attaching means 16 also includes a thread that, however, engages into a counter-thread in the first part 6. On the opposite side of the first attaching means 16 an outer profile 22 is provided, which can engage around a tool in order to rotate the first attaching means 16. Here the first carrier element 2 represents a supporting section on which the end of the first attaching means 16, which end is opposite the thread, can be supported. Alternatively the supporting section can also be formed by a washer or the like.

After the first carrier element 2 and the first part 4 as well as the second part 6 and the second carrier element 4 have each been attached to one another, the bearing assembly 1 rotatably supports the first carrier element 2 on the second carrier element 4. Here the attaching occurs from only one side 12 and at the same height. The parts 6, 8 therefore need not necessarily have different diameters, but can, if required.

In a bearing assembly known to date it was necessary to perform the attaching from both outer sides. For this purpose an attaching bolt or an attaching screw 16 was introduced into the first part 6 through the first carrier element 2 from the side of the first carrier element 2. The second carrier element 4 was subsequently attached to the second part 8, wherein an attaching bolt or an attaching screw 18 is introduced into the second part 8 through the second carrier element 4 from the side of the second carrier element 4. However, due to the two different attaching directions it was difficult to realize a completely automated attaching process.

An alternative attaching possibility known to date did in fact occur from one side, but the second part 8 had to have a larger diameter than the first part 6. The first part 6 and the first carrier element 2 were attached to each other from the left using an attaching screw 16. The second part 8 and the second carrier element 4 were also attached to each other from the left using an attaching screw 18, but on a different diameter than the first part 6 and the first carrier element 2. This led to one part having to be smaller and therefore could only carry lower loads.

These disadvantages are avoided by the bearing assembly 1 proposed in FIG. 1. Due to the passing of the second attaching means 18 through the first through-bore into the second through-bore the attaching can be effected from only one side, i.e. from the side of the first carrier element 2. The attaching process can thus proceed in a fully automated manner since the access occurs in a simple manner from only one side.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing assembly
2 First carrier element
4 Second carrier element
6 First part
8 Second part
10 Axis of rotation
12 Attachment direction
16 First attaching means
18 Second attaching means
20 Inner profile
22 Outer profile
24 Ring gear
26 Ring gear
28 Gear
30 Gear

What is claimed is:

1. A bearing assembly for rotatably supporting a first carrier element on a second carrier element, the bearing assembly comprising:
a first part comprising a first bearing element and a second part comprising a second bearing element configured to rotate about a common axis of rotation, the first part being attachable to the first carrier element using a first attaching means and the second part being attachable to the second carrier element using a second attaching means,
wherein the first part includes a first through-bore and the second part includes a second through-bore,
wherein the first and the second through-bores are aligned with each other, wherein the common axis of rotation does not pass through the first through-bore or through the second through-bore, wherein the second attaching means is configured to pass entirely through the first through-bore into the second through-bore and engage an interior of the second through-bore to fasten the second part to the second carrier element, and wherein the first attaching means is too large to pass entirely through the first through-bore and is configured to engage an interior of the first through-bore to fasten the first part to the first carrier element.

2. The bearing assembly according to claim 1, wherein the first attaching means comprises a first threaded fastener and the second attaching means comprises a second threaded fastener.

3. The bearing assembly according to claim 2, wherein the first through-bore and the second through-bore are coaxially and parallel to the common axis of rotation or wherein the first through-bore and the second through-bore are coaxially and perpendicular to the common axis of rotation.

4. The bearing assembly according to claim 2, wherein the second threaded fastener includes a profile on an axial end configured to receive a tool for attaching the second threaded fastener to the second carrier element.

5. The bearing assembly according to claim 2, wherein the first threaded fastener includes a head having a polygonal profile configured to be engaged by a tool for attaching the first threaded fastener to the first part.

6. The bearing assembly according to claim 2,
wherein the first through-bore includes a first internal thread,
wherein the first carrier element includes a supporting section, and
wherein the first threaded fastener is configured to engage the first internal thread of the first through-bore and to support itself on the supporting section of the first carrier element.

7. The bearing assembly according to claim 6, wherein the second carrier element includes a second internal thread, wherein the second part includes a supporting section, and wherein the second threaded fastener is configured to engage the second internal thread and to support itself on the supporting section of the second part.

8. The bearing assembly according to claim 2,
wherein the second threaded fastener comprises a threaded shank having a shank diameter and a head portion having a head diameter greater than the shank diameter,
wherein the first threaded fastener comprises a threaded shank having a shank diameter and a head portion having a head diameter greater than the shank diameter of the first threaded fastener,
wherein the head diameter of the second threaded fastener is less than the shank diameter of the first threaded fastener.

9. The bearing assembly according to claim 8, wherein the head portion of the second threaded fastener is located between the threaded shank of the first threaded fastener and the threaded shank of the second threaded fastener.

10. The bearing assembly according to claim 1, wherein the bearing assembly is a transmission housing.

11. The bearing assembly according to claim 1, wherein the first bearing element is an element of a radial bearing or an element of an axial bearing and wherein the second bearing element is an element of the radial bearing or an element of the axial bearing.

12. A robot including the bearing assembly according to claim 1.

13. The bearing assembly according to claim 1,
wherein the first carrier element includes a carrier through-bore and the second carrier element includes a carrier bore,
wherein the carrier through-bore is aligned with the first through-bore and the second through-bore is aligned with the carrier bore,
wherein the second attaching means is configured to pass entirely through the carrier through-bore and the first through-bore before entering the second through-bore, and
wherein a first portion of the second attaching means is located in the carrier bore of the second carrier element and a second portion of the second attaching means is located in the second through bore.

14. A method comprising:
a) providing a first carrier element having a carrier through-bore and a second carrier element having a carrier bore,
b) providing a first part comprising a first bearing element and a second part comprising a second bearing element configured to rotate about a common axis of rotation, the first part including a first through-bore and the second part including a second through-bore, the common axis of rotation not passing through the first through-bore or through the second through-bore;
c) aligning the carrier through-bore and the first through-bore and aligning the second through-bore and the carrier bore;
d) passing a first threaded fastener through the carrier through-bore and through the first through-bore and into the second through-bore and into the carrier bore to attach the second part to the second carrier element; and
e) after step d, passing a second threaded fastener through the carrier first bore and into the first through-bore to attach the first part to the first carrier element.

15. The method according to claim 14,
wherein the first threaded fastener includes a profile on an axial end configured to receive a tool for attaching the first threaded fastener to the second carrier element, and
wherein the second threaded fastener includes a head having a polygonal profile configured to be engaged by a tool for attaching the second threaded fastener to the first part.

* * * * *